(12) United States Patent
Doruk et al.

(10) Patent No.: US 7,385,373 B2
(45) Date of Patent: Jun. 10, 2008

(54) INTELLIGENT DISTRIBUTED ENERGY STORAGE SYSTEM FOR DEMAND SIDE POWER MANAGEMENT

(75) Inventors: Zeynep Bige Doruk, New York, NY (US); Ib Ingemann Olsen, New York, NY (US); Nicholas Blaise Pasquale, Somers, NY (US)

(73) Assignee: Gaia Power Technologies, Inc., New York, NY (US)

( * ) Notice: Subject to any disclaimer, the term of this patent is extended or adjusted under 35 U.S.C. 154(b) by 264 days.

(21) Appl. No.: 10/710,233

(22) Filed: Jun. 28, 2004

(65) Prior Publication Data

US 2004/0263116 A1 Dec. 30, 2004

Related U.S. Application Data

(60) Provisional application No. 60/482,987, filed on Jun. 30, 2003.

(51) Int. Cl.
*H02J 7/00* (2006.01)
*G08B 1/00* (2006.01)
*G06F 1/00* (2006.01)

(52) U.S. Cl. .................. 320/107; 340/531; 713/300

(58) Field of Classification Search ................ 320/107, 320/166; 340/531; 307/48; 702/57; 713/300
See application file for complete search history.

(56) References Cited

U.S. PATENT DOCUMENTS

| 6,633,823 | B2 * | 10/2003 | Bartone et al. ................ 702/57 |
| 6,697,951 | B1 | 2/2004 | Sinha et al. |
| 2002/0041126 | A1 * | 4/2002 | Provanzana et al. .......... 307/48 |

* cited by examiner

*Primary Examiner*—Gary L Laxton
*Assistant Examiner*—Yalkew Fantu
(74) *Attorney, Agent, or Firm*—Fish & Richardson P.C.

(57) ABSTRACT

The current invention is an intelligent distributed energy storage system for demand side power management. It provides a system that can store electric energy close to the point of use or close to the distributed production for use when demanded by the users. These storage nodes can communicate with a central clearing entity to negotiate if the nodes should buy energy for storage, provide energy to the user above a given power level, or sell power back to the grid. The function will depend on the amount of energy stored in the node, the cost of the electric energy, the cost of the electric peak power, the price of resold electrical energy and power, plus the local usage.

27 Claims, 4 Drawing Sheets

INTELLIGENT DISTRIBUTED ENERGY STORAGE SYSTEM FOR DEMAND SIDE POWER MANAGEMENT

CROSS REFERENCE TO RELATED APPLICATIONS

This is a non-provisional application that claims the priority date of provisional application 60/482,987.

BACKGROUND OF INVENTION

Field of the Invention

The present invention relates to energy storage system and more specifically it relates to a intelligent distributed energy storage system for demand side power management to provide a system that can store electric energy close to the point of use or close to the distributed production for use when demanded by the users. Description of the Prior Art It can be appreciated that energy storage systems have been in use for years. Typically, energy storage systems are comprised of a discharging device which upon demand converts the energy stored in the energy storage media to electricity suitable for the user or the distribution and transmission grid.

The main problem with conventional energy storage systems is they have a complex and expensive way of handling variation in the electricity usage. The way being short pulses or hour to hour variation. Another problem with conventional energy storage systems are that power generation, transmission lines, and distribution lines must be dimensioned for the maximum peak load expected and will therefore have a significant extra capacity which is only used for short intervals during the day or year. Another problem with conventional energy storage systems are the difficulty in incorporating smaller alternative power generators in its network, as they make the power generation more unpredictable.

While these systems may be suitable for the particular purpose to which they address, they are not as suitable to provide a system that can store electric energy close to the point of use or close to the distributed production for use when demanded by the users.

There is still room for improvement in the art.

SUMMARY OF INVENTION

The present invention is a new intelligent distributed energy storage system for demand side power management that has many of the advantages of the energy storage system mentioned heretofore and many novel features that result in a new and novel intelligent distributed energy storage system for demand side power management which is not anticipated, rendered obvious, suggested, or even implied by any of the prior art energy storage system, either alone or in any combination thereof.

To attain this, the present invention generally comprises a multitude of electrical energy storage devices equipped with a communication device and a microprocessor or computer. Each device is connected to the electrical distribution and transmission network and to a user or an electricity generator or both.

Furthermore, each device is connected to a communication network allowing it to exchange data and information with similar devices and other entities. The electrical energy storage device contains five sub components: A controller, which monitors and controls the device, based on the condition of the unit and the current and forecasted demand for electricity. A communication unit, which connects the unit to a network for exchanging information on electricity availability, demand, purchase cost, and selling price. An energy storage media, which can store energy for release on demand. A charging device, which upon demand converts the electricity from the distribution and transmission grid or from a local electricity generator to a form of energy acceptable by the energy storage media. A discharging device, which upon demand converts the energy stored in the energy storage media to electricity suitable for the user or the distribution and transmission grid.

The communication network is based on standard or proprietary protocols. It allows each energy storage device to communicate with each other and with any electricity exchanges and electricity control entities.

There has thus been outlined, rather broadly, the more important features of the invention in order that the detailed description thereof may be better understood, and in order that the present contribution to the art may be better appreciated. There are additional features of the invention that will be described hereinafter.

Objectives

A primary object of the present invention is to provide a intelligent distributed energy storage system for demand side power management that will overcome the shortcomings of the prior art devices.

An object of the present invention is to provide a intelligent distributed energy storage system for demand side power management to provide a system, that can store electric energy close to the point of use or close to the distributed production for use when demanded by the users.

Another object is to provide an intelligent distributed energy storage system for demand side power management that facilitates demand side power management to smooth out the difference in electricity production and electricity demand.

Another object is to provide an intelligent distributed energy storage system for demand side power management that provide distributed energy storage and load leveling close to the end user and/or close to the power generator.

Another object is to provide an intelligent distributed energy storage system for demand side power management that through communication with a central brokerage center or directly with multiple of similar units can buy or sell electricity based on price and demand.

Other objects and advantages of the present invention will become obvious to the reader and it is intended that these objects and advantages are within the scope of the present invention.

Definitions

Wide area communication network: This is a communication network based on standard or proprietary protocols. It allows each energy storage device to communicate with each other and with any electricity exchanges and electricity control entities. The physical properties of the network are not essential to the invention and can be made up of any combination of wireless and wire-based solution.

Distribution and transmission network: This is a network that transports electricity from at least one generator to at least one user in a controlled way. A multitude of electricity generators, users, and energy storage devices can be connected to this network. On a local scale the network is typically controlled by a Distribution Utility, which owns the transmission lines in the network and provides the connections between generators and users. Big centralized power plants powered by ie coal, natural gas, nuclear, or hydro, together with a comprehensive network of electrical transmission lines and local distribution lines.

BRIEF DESCRIPTION OF DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Figure 1:
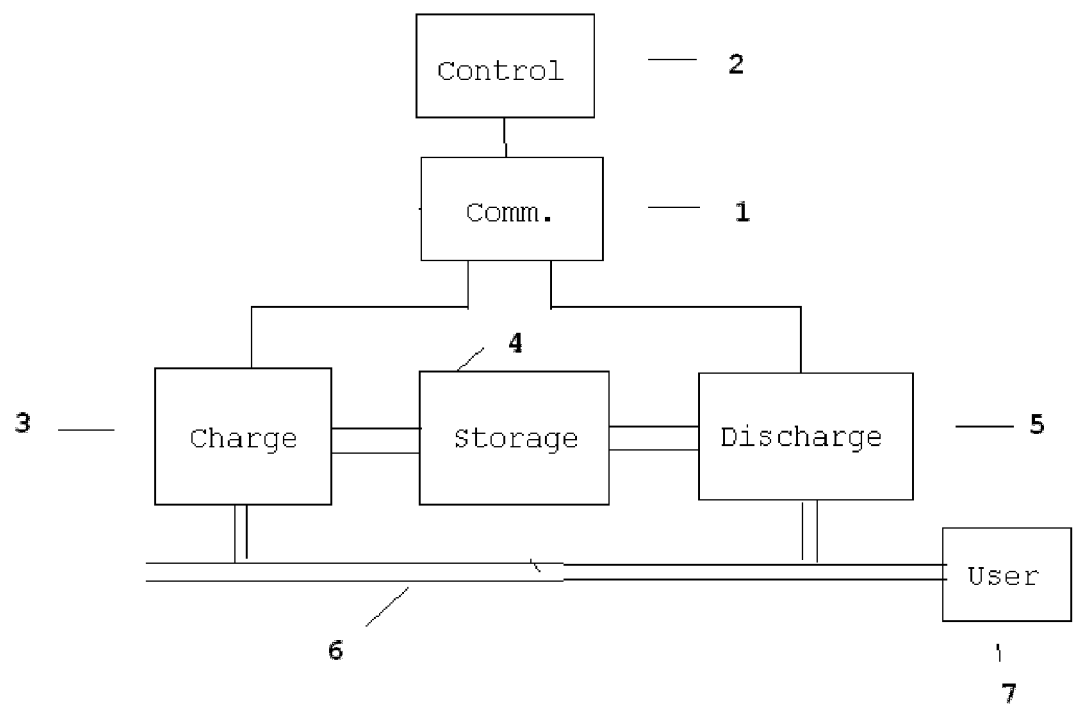
FIG. 1 displays a Distributed electricity generation and storage infrastructure using a central clearinghouse.

The following description is demonstrative in nature and is not intended to limit the scope of the invention or its application of uses.

There are a number of significant design features and improvements incorporated within the invention.

The present invention is an intelligent distributed energy storage system for demand side power management to provide a system that can store electric energy close to the point of use or close to the distributed production for use when demanded by the users.

This invention covers the use of energy storage devices distributed over an electrical distribution network. In the preferred embodiment, they have build in communication and algorithms so they can trade electricity and store it when it is available in sufficient amount and at an optimum purchase price. In one scenario the stored energy is used locally upon demand and in another scenario the energy is sold back to the distribution network when there is an external demand and an optimum selling price. In addition the device will function as an uninterruptible power supply for a defined time in case of a partial or full breakdown of the distribution network.

Turning now descriptively to the drawings, in which similar reference characters denote similar elements throughout the several views, the attached figures illustrate a intelligent distributed energy storage system for demand side power management, which comprises of a multitude of electrical energy storage devices equipped with a communication device and a microprocessor or computer.

Each device is connected to the electrical distribution and transmission network 17 and to a user or an electricity generator 14 or both. Furthermore each device is connected to a communication network allowing it to exchange data and information with similar devices and other entities.

The communication network based on standard or proprietary protocols. It allows each energy storage device 10 to communicate with each other and with any electricity exchanges and electricity control entities. The physical properties of the network are not essential to the invention and can be made up of any combination of wireless and wire based solution. This is a network that transports electricity from at least one generator 14 to at least one user in a controlled way. A multitude of electricity generators, users, and energy storage devices can be connected to this network.

On a local scale the network is typically controlled by a Distribution Utility, which owns the transmission lines in the network and provides the connections between generators and users.

The electrical energy storage device 10 contains five sub components: A controller, which monitors and controls the device based on the condition of the unit and the current and forecasted demand for electricity. A communication unit, which connects the unit to a network for exchanging information on electricity availability, demand, purchase cost, and selling price. An energy storage media, which can store energy for extended time for release on demand. This could be as electrochemical energy as in a battery, chemical energy as Hydrogen for use in a fuel cell, potential energy as water stored in an elevated reservoir, mechanical energy as stored by a spinning flywheel, or electrical energy as superconducting storage loops. A person skilled in the art will appreciate that this is not an exhaustive list and other energy storage means can be used in this invention. A charging device, which upon demand converts the electricity from the distribution and transmission grid or from a local electricity generator to a form of energy acceptable by the energy storage media. A discharging device, which upon demand converts the energy stored in the energy storage media to electricity suitable for the user or the distribution and transmission grid.

The structure of the electrical energy storage device 10 is given in FIG. 1. The central component is the control unit 2. This can be a computer or other programmable control device, which facilitates the operation of the device. It will coordinate the communication with the user, devices at the user, and any outside control entity through the communication module 1. Based on its programming the control unit 2 will determine if the energy storage device is working in peak shaving, uninterrupted power supply, arbitrage, or any other mode. The control unit 2 will also monitor and control the performance of the rest of the energy storage device. The device is supplied with electricity from the public electricity distribution network 6, which can be a local source or from the grid. The electricity is fed into the charging device 3 that upon demand converts the electricity to a form of energy acceptable by the energy storage media 4. This energy can be stored for extended time and released upon demand to the discharging device 5, which converts the stored energy to electricity of a quality acceptable for the user 7. If the unit is working in arbitrage mode the electricity can be fed back into the public electricity distribution network 6. The energy storage device can be located at an electricity source like a windmill, solar panel, and fuel cell. In that case the electricity source is connected to the charging device 3 and the public electricity distribution network is connected to the discharge device 5. The unit will still be able to supply electricity back to the electricity source in case they need a base electricity supply in order to be started up. Both windmills and fuel cells are known to need auxiliary power to function.

Figure 2:
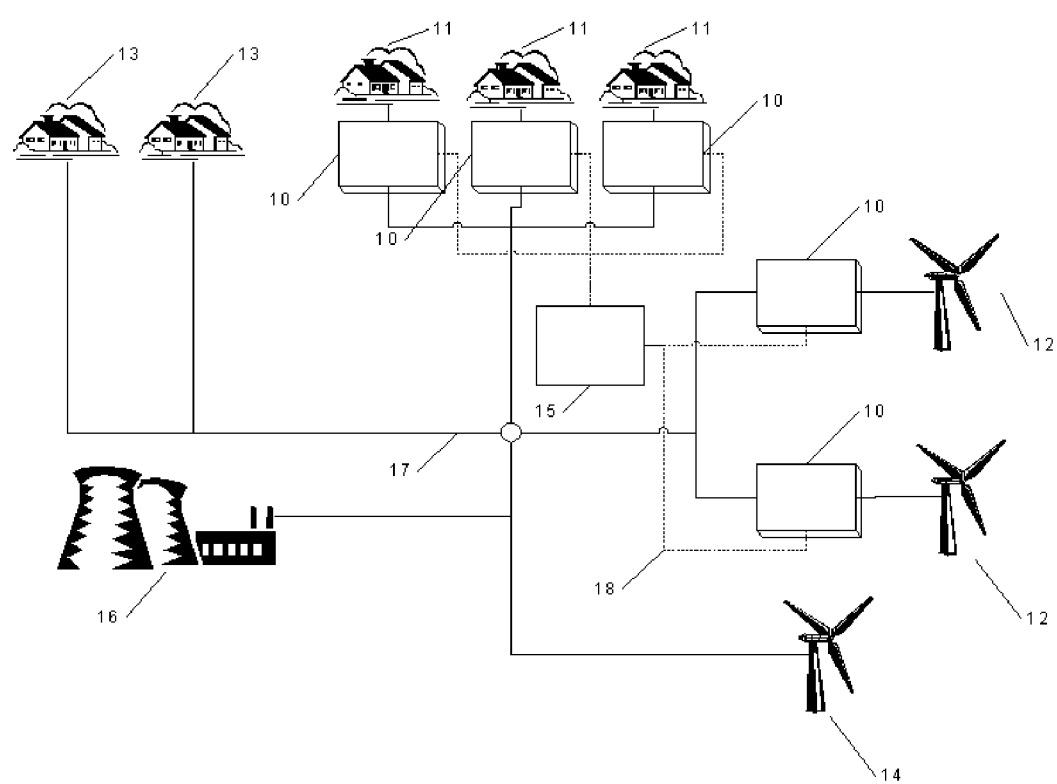
FIG. 2 displays a distributed electricity generation and storage infrastructure using peer-to-peer trading.
Figure 3:
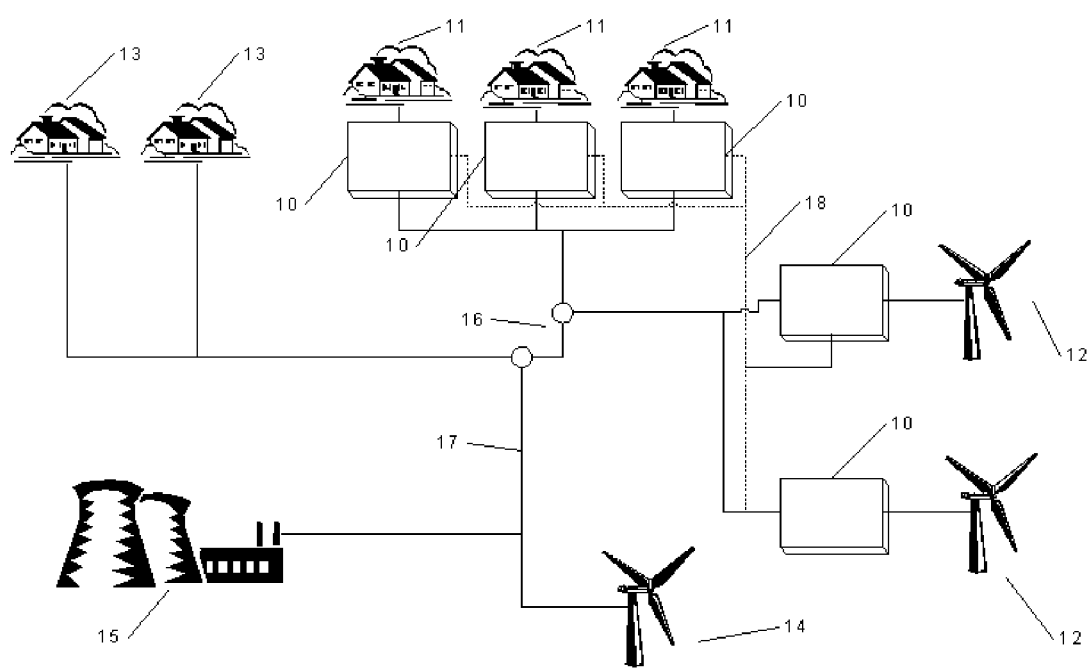
FIG. 3 displays a distributed storage infrastructure as a virtual generator.
Figure 4:
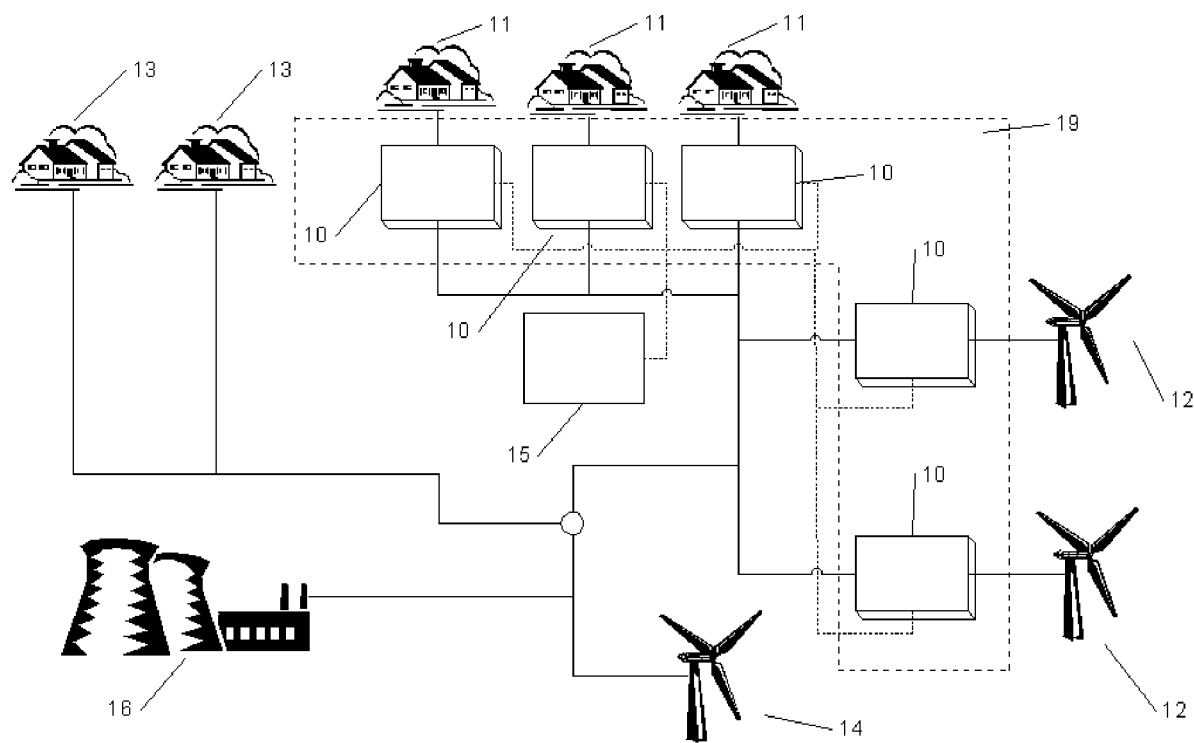
FIG. 4 displays a distributed electricity generation and storage infrastructure.

The wide area communication network 18 connects the energy storage devices 10 together as shown in FIGS. 2, 3, and 4. This allows the devices to communicate with each other and with a central control entity for power arbitrage, setting peak shaving levels, warning about blackouts and other disturbances on the power grid. The network can be controlled by a central entity as shown in FIG. 2; it can be a distributed peer-to-peer network as shown in FIG. 3, or it can be a combination of the two a shown in FIG. 4. A person skilled in the art will appreciate that other configurations of the network can be envisioned and still be within the principal scope of the invention.

Several physical configurations of the communication network can be envisioned. It can be based on proprietary or standard protocols and it can be a dedicated network or be part of a larger network like the Internet. The means of communication can be facilitated using electrical wires, glass fibers, radio waves, and light. In one scenario the communication can take place over the electrical wires using a signal superimposed on the base electricity delivery.

This is a network that transports electricity from at least one generator to at least one user in a controlled way. A multitude of electricity generators, users, and energy storage devices can be connected to this network. On a local scale the network is typically controlled by a Distribution Utility, which owns the transmission lines in the network and provides the connections between generators and users. The distribution and transmission network is the physical wires and associated equipment, which transport electricity between power generators and users as illustrated by [17] in FIGS. 2, 3 and 4.

Depending on the distances and the amount of power the wires need to transport, the operating voltage can be from 120 Volts to several thousand Volts. The power is normally of the alternating current (AC) type, but direct current can also be used. The distribution and transmission network should be constructed to accommodate the maximum power loads they can experience. As the average load is somewhat lower than the peak load the network will not be utilized optimally. However if sufficient capacity of energy storage devices is installed close to the user who generates the peak power demands, the difference between maximum power and average load can be reduced and the network can be utilized better. This will increase the energy transported per electrical wire and therefore reduce the cost and environmental impact.

Several physical configurations of the distribution and transmission network can be envisioned. It can be isolated in a geographical area such as an island or remote populated area with only local generation of power, it can be integrated over large areas to cover more populated areas with extensive redundancy using power generated from several big facilities, and it can be clusters of smaller networks loosely tied together with little redundancy.

The energy storage devices have at least three connections to operate according to this invention. One connection connects the device with an electrical source from which it can draw electrical energy. Another connection is with an electrical purchaser to which the device can discharge stored energy to on demand. The third connection facilitates the communication between the device and other similar devices or central clearinghouses to facilitate the operation of the device and trading of electrical power and energy. In case the energy storage device is located close to the user of electricity, this user becomes the purchaser and the electrical source will be the distribution and transmission network. In case the energy storage device is located close to a micro power generator, the purchaser will be the distribution and transmission network whereas the micro power generator becomes the electrical source. Combinations can also be envisioned where a micro power generator uses most of the generated power for local own use and only a fraction is sold to the purchaser.

Operation

In the preferred embodiment, the storage nodes can communicate with a central clearing entity to negotiate if the nodes should buy energy for storage, provide energy to the user above a given power level, or sell power back to the grid. The function will depend on the amount of energy stored in the node, the cost of the electric energy, the cost of the electric peak power, the price of resold electrical energy and power, plus the local usage.

The owner of the distributed energy storage node will be charged for the electrical energy and power used and credited for the energy and power sold. The means of communication can be any electronic data transfer including, but not limited to, wireless, telephone, cable, or power line communication technology. A person skilled in the art will appreciate, that there will be other communication methods and numerous protocols, which can be used without changing the fundamentals of the invention.

In one preferred embodiment each electrical energy storage node will have a unique address, so they can be identified without uncertainty. The central clearing house can be an independent entity, or it can owned by the distribution utilities or owned by the combined distributed energy storage corporation. The ownership structure is not significant as long as it can provide for a market driven price setting of electrical energy and power.

The price setting will be based on the current demand from the users, the degree of utilization of the transmission and distribution network, the base load provided by the central power generator, and the available power and energy from the all the electrical energy storage nodes plus any micro generators.

The financial transaction can take place at the same time as the electrical transaction, or the central clearing house or a third party for subsequent settling at regular intervals can track it.

In another preferred embodiment, the price and supply negotiation takes place directly between the electrical energy storage nodes in a peer-to-peer network. A node will broadcast that it needs a certain amount of electrical energy to all the other nodes in the network and based on the feedback from each node it will find the most favorable buying price. The buying node will negotiate with the selling node and transfer the agreed upon amount of money to the selling node. Conversely an electrical energy storage node can broadcast that it wants to sell energy, and based on the feedback from each node it will find the most favorable selling price.

In yet another embodiment a central control entity can remotely control or request the energy storage devices at the users and micro generators when they should work in peak shaving mode or in charge mode based on the aggregated demand from all users in an area and the supply from the base providers. The central control entity can also warn the energy storage devices of impeding scheduled loss of electricity, giving the devices time to fully charge.

Alternative Embodiment

In another implementation the energy storage device 10 is located close to a power generation source 14. The source delivers the energy into the device as it is generated and it is sold to the distribution network when there is an external demand and an optimum selling price. In addition, if the power generation needs auxiliary power to operate, the energy storage device can deliver the power in case of a partial or full breakdown of the distribution network. As more energy storage capacity is installed on the distribution network, the peak power load on the network is reduced, and the average capacity of the distribution network can be increased and thereby reduce the capital cost and environmental impact of transporting power. Also as peak power typically is more expensive to generate than a constant supply, using the energy storage devices to provide part of or all of the peak demand the cost of generating electricity can go down. A central clearinghouse can establish the power demand at any given time together with a trading price, and it can facilitate the trading with individual energy storage devices or with clusters of same. Alternatively the energy storage devices can trade power and electricity with each other directly depending on their individual demands.

Advantages

In these respects, the intelligent distributed energy storage system for demand side power management according to the present invention substantially departs from the conventional concepts and designs of the prior art, and in so doing provides a system primarily developed for the purpose of providing a system that can store electric energy close to the point of use or close to the distributed production for use when demanded by the users.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A distributed energy storage device that is configured for connection to one or more other distributed energy storage devices over an electrical distribution network, the distributed energy storage device comprising:
    an energy storage medium for storing energy;
    a controller for controlling operation of the distributed energy storage device; and
    a communications unit that is configured to enable the distributed energy storage device to communicate and exchange electricity transfer information with the other distributed energy storage devices, wherein the controller is configured to:
        monitor a level of the energy stored in the energy storage medium,
        determine whether to initiate a transfer of electrical energy between the distributed energy storage device and one of the other distributed energy storage devices based on electricity transfer information exchanged through the communications unit with the one other distributed energy storage device and one or more of the monitored level of the energy stored in the energy storage medium and a forecasted energy demand, and
        in response to a determination to initiate a transfer of electrical energy between the distributed energy storage device and the one other distributed energy storage device, initiate a transfer of electrical energy between the distributed energy storage device and the one other distributed energy storage device over the electrical distribution network.

2. The distributed energy storage device of claim 1 wherein:
    the controller is configured to determine an energy need at the distributed energy storage device;
    the communications unit is configured to exchange electricity transfer information with the other distributed energy storage devices by:
        broadcasting an energy request signal to the other distributed energy storage devices in response to a determination of an energy need at the distributed energy storage device by the controller, and
        receiving an energy offer signal from at least the one other distributed energy storage device in response to the broadcasted energy request signal; and
    the controller is further configured to:
        determine whether to initiate a transfer of electrical energy from the one other distributed energy storage device to the distributed energy storage device based on the received energy offer signal from the one other distributed energy storage device, and
        initiate a transfer of electrical energy from the one other distributed energy storage device to the distributed energy storage device over the power distribution network in response to a determination to initiate a transfer of electrical energy from the one other distributed energy storage device to the distributed energy storage device.

3. The distributed energy storage device of claim 1 wherein:
    the communications unit is configured to exchange electricity transfer information with the other distributed energy storage devices by:
        broadcasting an energy offer signal to at least the one other distributed energy storage device, and
        receiving an energy acceptance signal from the one other distributed energy storage device in response to the broadcasted energy offer signal, and the controller is configured to:
        determine whether to initiate a transfer of electrical energy from the distributed energy storage device to the one other distributed energy storage device based on the received energy acceptance signal from the one other distributed energy storage device, and
        initiate a transfer of electrical energy from the distributed energy storage device to the one other distributed energy storage device over the power distribution network in response to a determination to initiate a transfer of electrical energy from the distributed energy storage device to the one other distributed energy storage device.

4. The distributed energy storage device of claim 1 wherein the distributed energy storage device and the other distributed energy storage devices are distributed across the electrical distribution network and are physically separate from a centralized energy exchange.

5. The distributed energy storage device of claim 1 wherein the distributed energy storage device is remote from the other distributed energy storage devices.

6. The distributed energy storage device of claim 1 wherein the communications unit is configured to enable the distributed energy storage device to communicate and exchange electricity transfer information with the other distributed energy storage devices over a communications network that connects the distributed energy storage device and the other distributed energy storage devices.

7. The distributed energy storage device of claim 1 wherein the communications unit is configured to enable the distributed energy storage device to communicate and exchange electricity transfer information with the other distributed energy storage devices over a peer-to-peer communications network that connects the distributed energy storage device and the other distributed energy storage devices.

8. The distributed energy storage device of claim 1 wherein the communications unit is configured to enable the distributed energy storage device to communicate and exchange electricity transfer information with the other distributed energy storage devices over a wireless communications network that connects the distributed energy storage device and the other distributed energy storage devices.

9. The distributed energy storage device of claim 6 wherein the electrical distribution network and the communications network are the same and the communications unit is configured to communicate and to exchange electricity transfer information with the other distributed energy storage devices by superimposing a communications signal on an electrical energy signal.

10. The distributed energy storage device of claim 1 wherein the communications unit is configured to exchange, with the one other energy storage device, electricity transfer information that includes information related to one or more of energy availability, energy demand, energy purchase costs, and energy sale prices.

11. The distributed energy storage device of claim 1 wherein the energy storage medium comprises one or more of a battery, a fuel cell, water stored in an elevated reservoir, a flywheel, and superconducting storage loops.

12. The distributed energy storage device of claim 1 wherein the distributed energy storage device is located at a load serviced by the distributed energy storage device.

13. The distributed energy storage device of claim 1 wherein the distributed energy storage device is located at an energy source that provides energy to the distributed energy storage device.

14. A method for initiating a transfer of energy to a distributed energy storage device that is connected to one or more other distributed energy storage devices over an electrical distribution network, the method comprising:
   monitoring a level of energy stored by the distributed energy storage device;
   based on the level of energy stored by the distributed energy storage device and a forecasted energy demand, determining an energy need at the distributed energy storage device;
   broadcasting an energy request signal to the one or more other distributed energy storage devices in response to determining the energy need at the distributed energy storage device;
   receiving one or more offers of available energy from one or more corresponding distributed energy storage devices in response to the broadcasted energy request signal;
   selecting one offer of available energy from among the offers of available energy and identifying one other distributed energy storage device that corresponds to the selected offer of available energy; and
   in response to selecting the one offer of available energy and identifying the one other distributed energy storage device that corresponds to the selected offer of available energy, initiating a transfer of electrical energy from the one other distributed energy storage device to the distributed energy storage device over the electrical distribution network.

15. The method of claim 14 further comprising enabling a transfer of an amount of money from an entity associated with the distributed energy storage device to an entity associated with the one other distributed energy storage device in exchange for the electrical energy transferred from the one other distributed energy storage device to the distributed energy storage device.

16. The method of claim 14 further comprising:
   receiving, from the one other distributed energy storage device, a request to transfer an amount of energy to the one other distributed energy storage device;
   determining that the amount of energy is available to transfer at the distributed energy storage device; and
   initiating another transfer of electrical energy from the distributed energy storage device to the one other distributed energy storage device in response to receiving the request and determining that the amount of energy is available.

17. The method of claim 14 wherein:
   the one or more offers of available energy include one or more available energy sale prices; and
   selecting one offer of available energy comprises selecting a lowest available energy sale price from among the one or more available energy sale prices.

18. The method of claim 14 wherein determining an energy need at the distributed energy storage device comprises:
   forecasting a predicted energy demand in advance of an actual energy demand; and
   determining an energy need at the distributed energy storage device based on the forecasted predicted energy demand.

19. A distributed energy storage device that is configured for connection to one or more other distributed energy storage devices over an electrical distribution network, the distributed energy storage device comprising:
   means for monitoring a level of energy stored by the distributed energy storage device;
   means for determining an energy need at the distributed energy storage device based on the level of energy stored by the distributed energy storage device and a forecasted energy demand;
   means for broadcasting an energy request signal to the one or more other distributed energy storage devices in response to determining the energy need at the distributed energy storage device;
   means for receiving one or more offers of available energy from one or more corresponding distributed energy storage devices in response to the broadcasted energy request signal;
   means for selecting one offer of available energy from among the one or more offers of available energy and identifying one other distributed energy storage device that corresponds to the selected offer of available energy; and
   means for initiating a transfer of electrical energy from the one other distributed energy storage device to the distributed energy storage device over the electrical distribution in response to selecting the one offer of available energy and identifying the one other distributed energy storage device that corresponds to the selected offer of available energy.

20. The distributed energy storage device of claim 1 wherein the controller is further configured to:
   determine that an entity that is external to the distributed energy storage device is demanding energy;

determine that a price that the entity that is external to the distributed energy storage device is willing to pay for the energy it is demanding is advantageous;

determine that a sufficient amount of energy is stored in the energy storage medium; and based on determining that the entity that is external to the distributed energy storage device is demanding energy, that the price that the entity that is external to the distributed energy storage device is willing to pay for the energy it is demanding is advantageous, and that a sufficient amount of energy is stored in the energy storage medium, initiating a sale of energy to the entity that is external to the distributed energy storage device.

21. The distributed energy storage device of claim 1 wherein the controller is configured to determine whether to initiate a transfer of electrical energy between the distributed energy storage device and one of the other distributed energy storage devices based on the electricity transfer information exchanged through the communications unit with the one other distributed energy storage device and the level of the energy stored in the energy storage medium.

22. The distributed energy storage device of claim 1 wherein the controller is configured to determine whether to initiate a transfer of electrical energy between the distributed energy storage device and one of the other distributed energy storage devices based on the electricity transfer information exchanged through the communications unit with the one other distributed energy storage device and the forecasted energy demand.

23. The distributed energy device of claim 22 wherein the controller is configured to:
    forecast energy demand; and
    determine whether to initiate a transfer of electrical energy between the distributed energy storage device and one of the other distributed energy storage devices based on the electricity transfer information exchanged through the communications unit with the one other distributed energy storage device and the energy demand forecasted by the controller.

24. The distributed energy storage device of claim 1 wherein the controller is configured to determine whether to initiate a transfer of electrical energy between the distributed energy storage device and one of the other distributed energy storage devices based on the electricity transfer information exchanged through the communications unit with the one other distributed energy storage device, the level of the energy stored in the energy storage medium, and the forecasted energy demand.

25. The distributed energy storage device of claim 19 wherein the means for determining an energy need at the distributed energy storage device comprises:
    means for forecasting a predicted energy demand in advance of an actual energy demand; and
    means for determining an energy need at the distributed energy storage device based on the forecasted predicted energy demand.

26. A distributed energy storage device that is configured for connection to one or more other distributed energy storage devices over an electrical distribution network, the distributed energy storage device comprising:
    an energy storage medium for storing energy;
    a controller for controlling operation of the distributed energy storage device and for determining an energy need at the distributed energy storage device; and
    a communications unit, wherein:
        the communications unit is configured to enable the distributed energy storage device to:
            broadcast an energy request signal to one or more of the other distributed energy storage devices in response to a determination of an energy need at the distributed energy storage device by the controller, and
            receive one or more energy offer signals from one or more of the other distributed energy storage devices in response to the broadcasted energy request signal; and
        the controller is configured to:
            select at least one of the received energy offer signals and identify at least one other distributed energy storage device that corresponds to the selected energy offer signal, and
            initiate a transfer of electrical energy from the one other distributed energy storage device to the distributed energy storage device over the electrical distribution network based on selecting the received energy offer signal and identifying the one other distributed energy storage device that corresponds to the selected energy offer signal.

27. A distributed energy storage device that is configured for connection to one or more other distributed energy storage devices over an electrical distribution network, the distributed energy storage device comprising:
    an energy storage medium for storing energy;
    a controller for controlling operation of the distributed energy storage device; and
    a communications unit, wherein:
        the communications unit is configured to enable the distributed energy storage device to:
            broadcast an energy offer signal to one or more of the other distributed energy storage devices, and
            receive one or more energy acceptance signals from one or more of the other distributed energy storage devices in response to the broadcasted energy offer signal; and
        the controller is configured to:
            select at least one of the received energy acceptance signals and identify at least one other distributed energy storage device that corresponds to the selected energy acceptance signal, and
            initiate a transfer of electrical energy from the distributed energy storage device to the one other distributed energy storage device over the electrical distribution network based on selecting the received energy acceptance signal and identifying the one other distributed energy storage device that corresponds to the selected energy acceptance signal.

* * * * *